(12) United States Patent
Ramirez Lugo

(10) Patent No.: US 12,451,597 B2
(45) Date of Patent: Oct. 21, 2025

(54) VEHICLE INTERIOR ANTENNA MOUNT SYSTEM

(71) Applicant: Ford Global Technologies, LLC, Dearborn, MI (US)

(72) Inventor: Hector Eduardo Ramirez Lugo, San Mateo Atenco (MX)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 18/429,948

(22) Filed: Feb. 1, 2024

(65) Prior Publication Data

US 2025/0253522 A1  Aug. 7, 2025

(51) Int. Cl.
H01Q 1/32 (2006.01)

(52) U.S. Cl.
CPC ......... *H01Q 1/3266* (2013.01); *H01Q 1/3291* (2013.01)

(58) Field of Classification Search
CPC ...... H01Q 1/32; H01Q 1/3266; H01Q 1/3275; H01Q 1/3291
See application file for complete search history.

(56) References Cited

U.S. PATENT DOCUMENTS

| | | | | |
|---|---|---|---|---|
| 3,918,319 A | * | 11/1975 | Mills | B60R 1/068 74/502.1 |
| 3,966,162 A | * | 6/1976 | Hadley | B60R 1/068 74/502.1 |
| 6,166,698 A | * | 12/2000 | Turnbull | B60C 23/061 343/700 MS |
| 6,318,870 B1 | * | 11/2001 | Spooner | B60R 1/086 359/872 |
| 6,420,975 B1 | * | 7/2002 | DeLine | G06Q 20/341 381/86 |
| 6,547,133 B1 | * | 4/2003 | DeVries, Jr. | G06Q 20/341 235/382.5 |
| 6,808,277 B2 | | 10/2004 | Matsuura et al. | |
| 7,008,069 B2 | * | 3/2006 | Ostreko | B60R 1/12 359/872 |
| 8,405,726 B2 | | 3/2013 | Schofield et al. | |
| 2003/0107521 A1 | | 6/2003 | Matsuura et al. | |
| 2017/0200197 A1 | | 7/2017 | Brubaker | |
| 2017/0305349 A1 | | 10/2017 | Naboulsi | |
| 2018/0175491 A1 | | 6/2018 | DeMersseman | |
| 2019/0041222 A1 | | 2/2019 | Grewal et al. | |
| 2019/0141467 A1 | | 5/2019 | Breed | |
| 2020/0294401 A1 | | 9/2020 | Kerecsen | |
| 2021/0356279 A1 | | 11/2021 | Szigeti | |
| 2022/0413497 A1 | | 12/2022 | Hicok et al. | |
| 2023/0176577 A1 | | 6/2023 | Ditty et al. | |
| 2023/0177885 A1 | | 6/2023 | Kramer et al. | |
| 2023/0202388 A1 | | 6/2023 | Karner et al. | |

* cited by examiner

*Primary Examiner* — Tho G Phan
(74) *Attorney, Agent, or Firm* — Vichit Chea; Price Heneveld LLP

(57) ABSTRACT

A vehicle interior antenna mount system having a pedestal mount extending from a vehicle component in a cabin interior of a vehicle. The pedestal mount has a vertical slot extending from one end and one or more detents, an antenna module housing an antenna, and a locking arm connected to the antenna housing. The locking arm has a rib configured to engage the slot in the pedestal mount, wherein the snap arm includes an engagement portion that engages the at least one detent to lock the antenna housing on the pedestal mount.

20 Claims, 4 Drawing Sheets

VEHICLE INTERIOR ANTENNA MOUNT SYSTEM

FIELD OF THE DISCLOSURE

The present disclosure generally relates to a vehicle mounted antenna, and more particularly relates to an interior antenna mount on a vehicle.

BACKGROUND OF THE DISCLOSURE

Motor vehicles are commonly equipped with one or more antennas that allow communication with a cellular network infrastructure. For example, antennas may be used to communicate vehicle-to-vehicle or vehicle-to-infrastructure or vehicle-to-networks, by using existing cellular network infrastructure. It may be desirable to provide for an enhanced antenna mount arrangement on the vehicle.

SUMMARY OF THE DISCLOSURE

According to a first aspect of the present disclosure, a vehicle interior antenna mount system includes a pedestal mount extending from a vehicle component in a cabin interior of a vehicle with the pedestal mount having a vertical slot extending from one end and one or more detents, an antenna module housing an antenna, and a locking arm connected to the antenna housing. The locking arm has a rib configured to engage the slot in the pedestal mount, wherein the locking arm includes an engagement portion that engages the at least one detent to lock the antenna housing on the pedestal mount.

Embodiments of the first aspect of the present disclosure can include any one or a combination of the following features:
- the at least one detent includes first and second detents;
- each of the first and second detents includes an upper ramp surface and a rear locking wall;
- the pedestal mount includes an angled support arm that extends from the vehicle component, wherein the angled support arm distances the pedestal mount from the vehicle component;
- the angled support arm distancing the antenna module from the pedestal mount;
- the locking arm having a T-shaped arm;
- the vertical slot extending from a top end of the pedestal mount;
- the locking arm is a snap fit locking arm;
- the vehicle component is a mirror assembly; and
- the component includes a mirror mount for a rearview mirror assembly.

According to a second aspect of the present disclosure, a vehicle interior antenna mount system includes a pedestal mount extending from a rearview mirror assembly in a cabin interior of a vehicle with the pedestal mount having a vertical slot extending from an end and one or more detents, an antenna module for housing an antenna, and a locking arm connected to the antenna module. The locking arm has a rib configured to engage the slot in the pedestal mount, wherein the locking arm includes an engagement portion that engages the at least one detent to lock the antenna module on the pedestal mount.

Embodiments of the second aspect of the present disclosure can include any one or a combination of the following features:
- the at least one detent having a first detent and a second detent;
- each of the first and second detents having an upper ramp surface and a rear locking wall;
- the pedestal mount having an angled support arm that extends from the rearview mirror assembly, wherein the angled support arm distances the pedestal mount from the rearview mirror assembly;
- the pedestal mount having a vertical plate connected to the angled support arm;
- the locking arm with a T-shaped arm;
- the vertical slot extending from a top end of the pedestal mount;
- the locking arm is a snap fit locking arm;
- the rearview mirror assembly is located proximate a roof and windshield in the vehicle; and
- the rearview mirror mount includes a pedestal mount, wherein the pedestal mount connects to the mirror mount.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
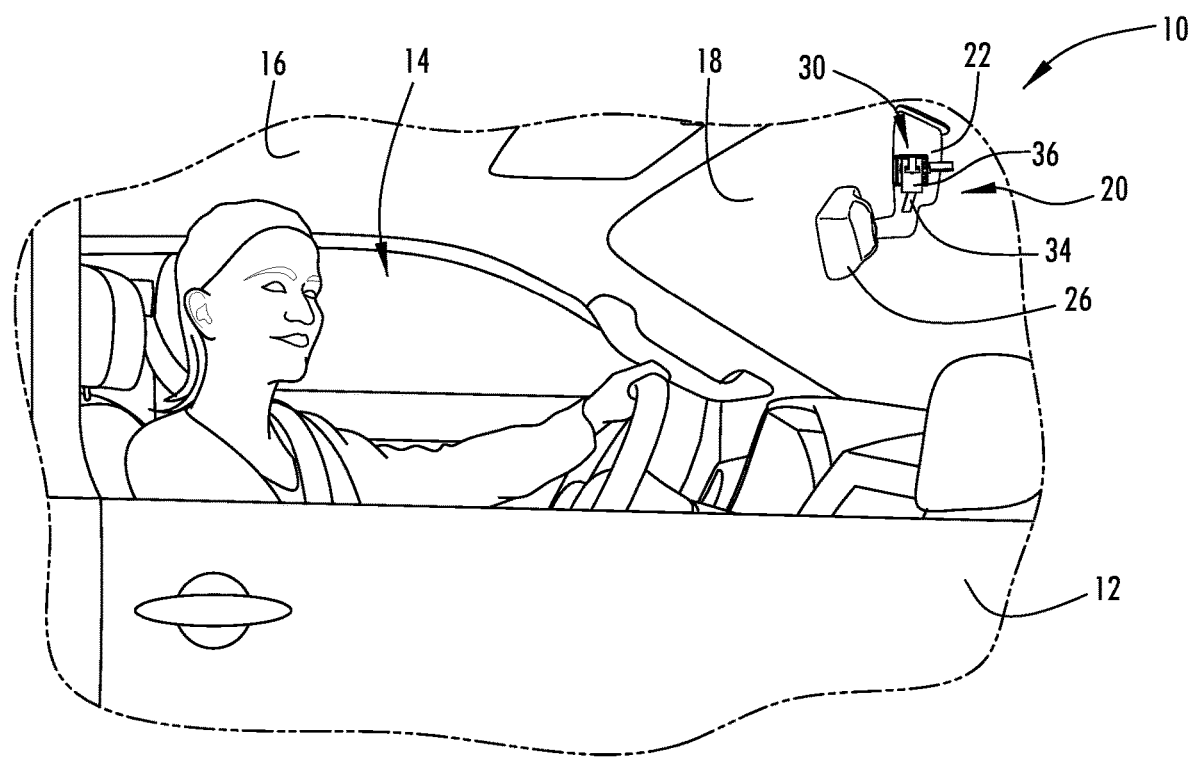
FIG. 1 is a perspective view of a motor vehicle equipped with an antenna mount system on a mirror mount of a rearview mirror assembly, according to one example.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle interior antenna mount system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, an automotive or motor vehicle 10 is generally illustrated in the form of a passenger vehicle having an antenna mount system 30 located on the motor vehicle 10 within the vehicle interior 14, according to one embodiment. The motor vehicle 10 has a body 12 which generally defines the cabin interior 14. The body 12 typically has body panels, windows including a windshield, a roof, and access doors. The motor vehicle 10 is also equipped with a plurality of wheel and tire assemblies that connect to axles on the motor vehicle 10. The cabin interior 14 generally defines a passenger compartment that typically includes a plurality of seat assemblies. It should be appreciated that the motor vehicle 10 may be equipped with various seating arrangements and other various accommodations and accessories, including a navigation system and vehicle communication electronics that may transmit and receive signals with one or more antennas, according to various embodiments.

The body 12 further includes a roof 16 defining the top side of the cabin interior 14 and a windshield 18 generally at the front end of the cabin interior 14. The cabin interior 14 is equipped with a rearview mirror assembly 20 which in the exemplary embodiment shown is generally positioned below the roof 16 and rearward of the windshield 18. The rearview mirror assembly 20 may be connected to the roof 16 or may be connected to the windshield 18. The rearview mirror assembly 20 includes a mirror mount 22 which includes a top end connection for connecting to the roof 16 via fasteners, according to one example.

Figure 2:
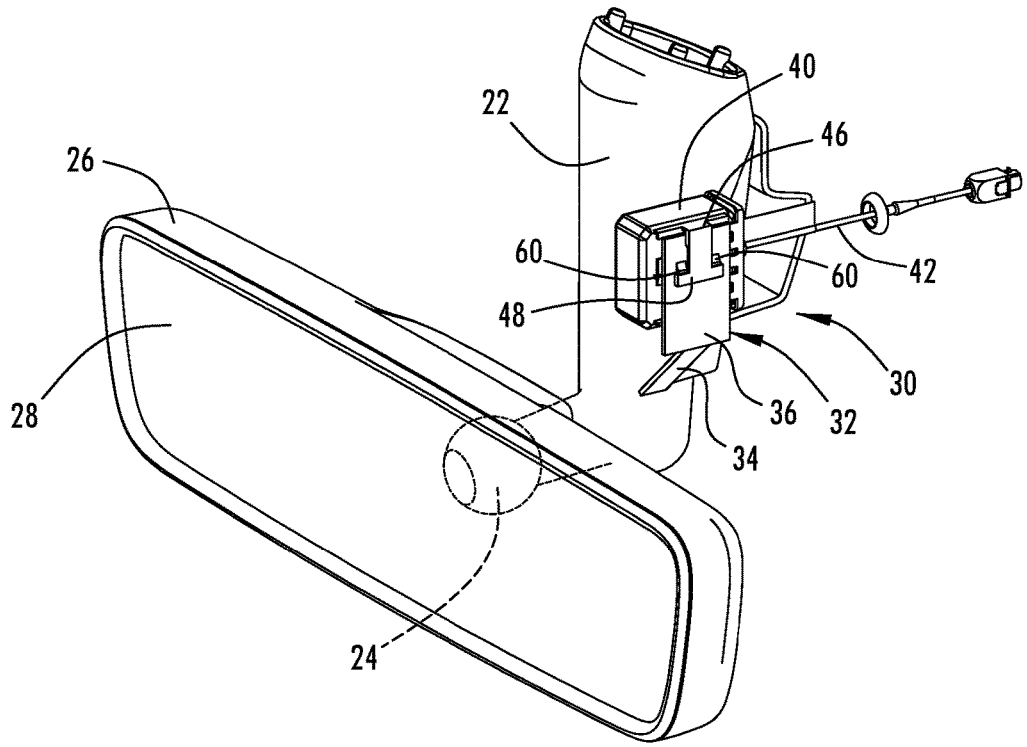
FIG. 2 is a rear perspective view of the rearview mirror assembly having the antenna mount system arranged thereon.

With reference to FIG. 2, the mirror mount 22 shown is a single pivot with trilobe mount that generally has an elbow or L-shape body with a spherical ball joint mount 24 on a proximal lower end thereof (Single Pivot), according to one example. The ball joint mount 24 is configured to matingly engage with a ball socket in a mirror housing 26 to allow the mirror housing 26 to rotate in a multitude of directions about the horizontal and vertical axes to adjust the mirror viewing alignment for the driver of the motor vehicle 10. The mirror housing 26 includes a mirror 28 on the rearward facing side which is generally used as a rearview mirror. In addition, the mirror housing 26 may include various electronics and other electrical circuitry components. Other types of mirror mounts such as wedge mounts and double pivot mounts may be used.

The rearview mirror assembly 20 includes an antenna mount system 30 which is shown connected to the mirror mount 22. The antenna mount system 30 includes a sliding snap fit mount for receiving and connecting an antenna or multiple antennas enclosed within an antenna module 40 on the exterior side of the mirror mount 22 and spaced therefrom. As such, the antenna or antennas within the antenna module 40 may be mounted within a central portion of the motor vehicle 10 and spaced at a distance from metal components and other electronics within the motor vehicle 10.

Figure 3A:
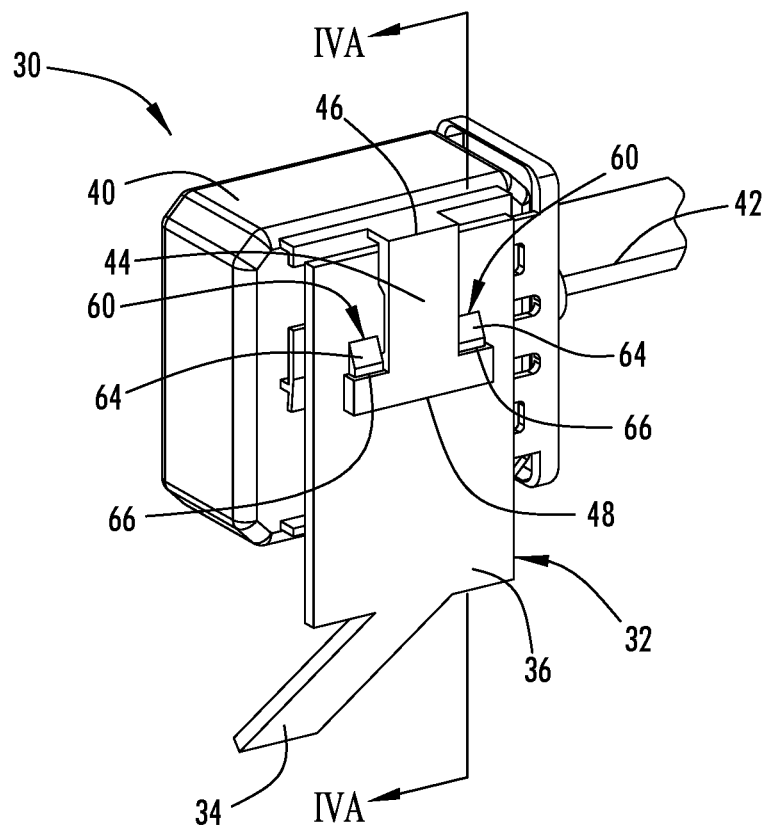
FIG. 3A is a side perspective view of the antenna mount system having an antenna module mounted on a pedestal mount.
Figure 3B:
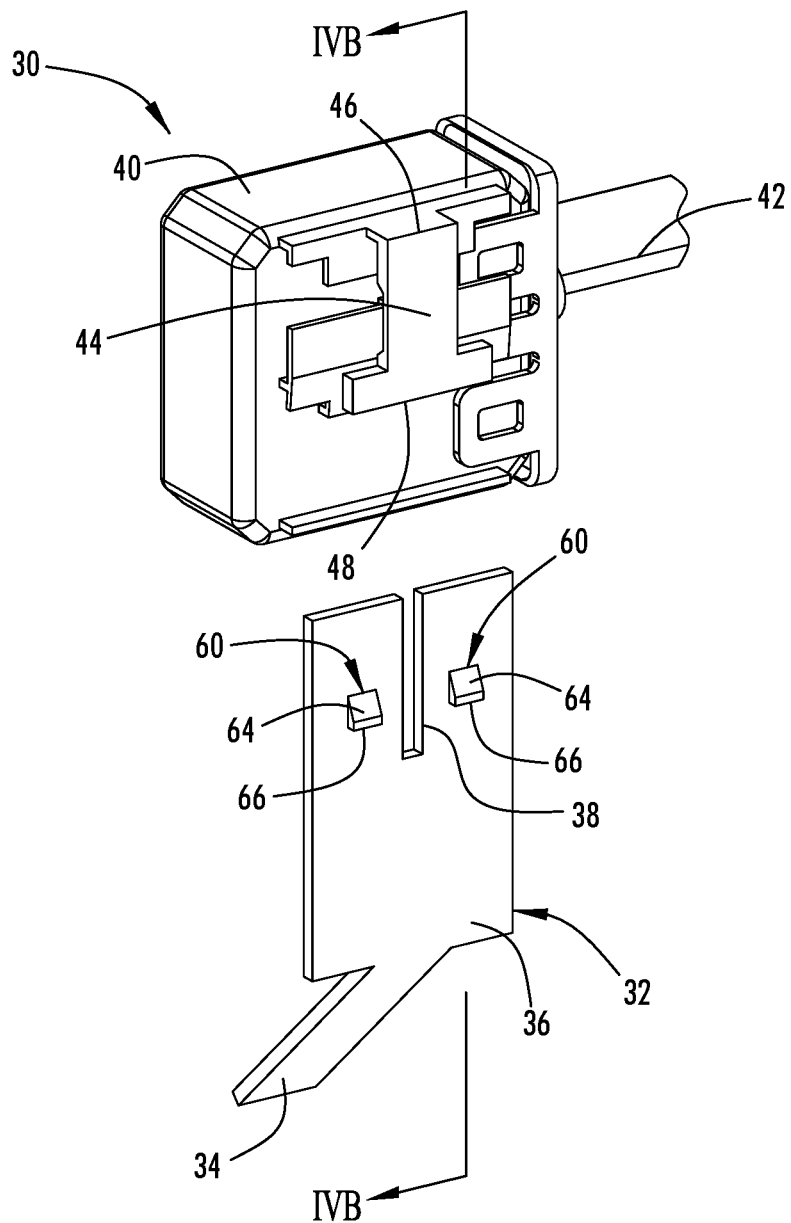
FIG. 3B is an exploded view of the antenna mount system with the antenna module disassembled from the pedestal mount.

The antenna mount system 30 includes a pedestal mount 32 shown in one example as an angled bracket that is connected to or integrally formed with the mirror mount 22 as seen in FIGS. 3A and 3B. The pedestal mount 32 has a body or housing generally defining a hollow interior space that may house electrical wiring and electronics. The pedestal mount 32 may be made of metal or polymeric material, for example. The pedestal mount 32 includes an upward angled support arm 34 provided on the outer side wall connected at the bottom end leading to a vertical plate 36 at the upper end. As such, the angled support arm 34 supports and distances the vertical plate 36 from the housing of the mirror mount 22 and creates a spacing between the mirror mount 22 and the vertical plate 36 for receiving the antenna module 40. The vertical plate 36 is generally rectangular and has a vertical slot 38 centrally extending from the upper end downward by a distance sufficient to receive the mating mount on the antenna module 40. It should be appreciated that the vertical plate 36 may have other shapes and sizes, according to one example.

Figure 4A:
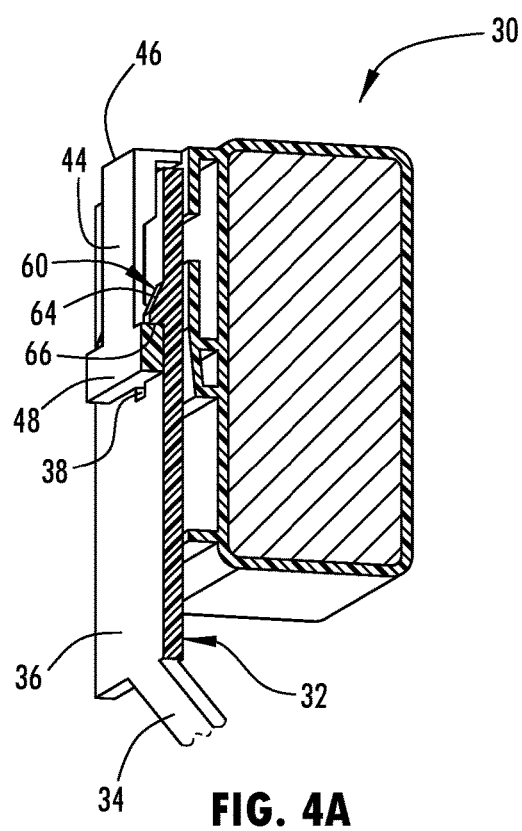
FIG. 4A is a cross-sectional view of the antenna mount system taken through lines VA-VA of FIG. 3A.
Figure 4B:
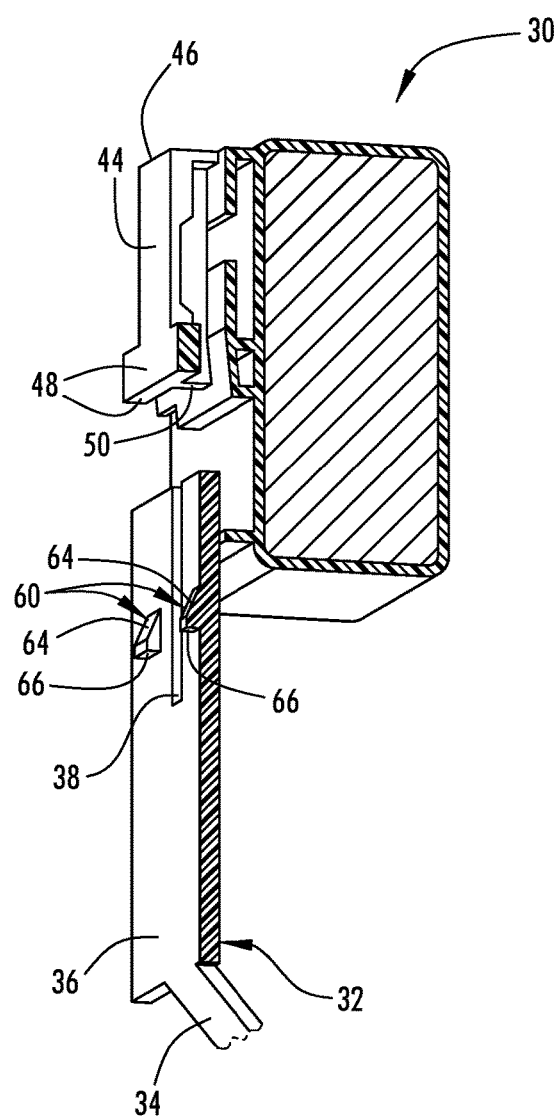
FIG. 4B is a cross-sectional view of the antenna mount system taken through lines VB-VB of FIG. 3B.

The antenna module 40 has a T-shaped snap fit locking arm 44 which is connected at a top end 46 and has a T-shaped end portion 48 at the bottom end. The T-shaped snap fit locking arm 44 may be made of plastic or polymeric material and is flexible at the lower end such that it may flex outward with memory to provide an inward bias force. The locking arm 44 may be bent outward with force and biased inward when force is no longer applied. The antenna module 40 is configured to be disposed on the pedestal mount 32 from a disassembled position seen in FIGS. 3B and 4B to the assembled position seen in FIGS. 3A and 4A. In doing so, the T-shaped snap fit locking arm 44 has an elongated rib 50 that extends vertically and is configured to engage and slide downward within vertical slot 38 during the assembly process. As the antenna module 40 is assembled from the top downward onto the pedestal mount 32, the rib 50 matingly engages the vertical slot 38 and the antenna module 40 slides downward until an engagement portion 66 of the T-shaped end portion 48 of the snap fit locking arm 44 engages a pair of detents 60 on the outside surface of the pedestal mount 32. With continued downward force, the T-shaped snap fit locking arm 44 continues to engage an upper ramp surface 62 on each detent 60 and slides downward over the detents with a return force and the engagement portion 66 engages the backside of a lower wall 64 of each detent 60 with the return force to lock the snap fit locking arm 44 in place on the pedestal mount 32.

It should be appreciated that the antenna module 40 may be easily inserted on the top side of the pedestal mount 32 and assembled onto the pedestal mount 32 with downward force and may be removed and replaced simply by applying an outward and upward force on the T-shaped end portion 48 of the snap fit locking arm 44 and forcing the antenna module 40 upwards to remove the antenna module 40 from the pedestal mount 32. As such, different antenna modules including different types of antenna modules may be assembled onto and disassembled from the antenna mount system 30.

The antenna mount system 30 allows for an antenna module 40 containing one or more antennas to be mounted for use within the cabin interior 14 of the motor vehicle 10. With the antenna module 40 assembled onto and connected to the antenna mount system 30, the one or more antennas and associated electronics may be coupled in communication with signal processing circuitry via a coaxial connector 42 and associated signal lines, for example. Coaxial connector 42 may connect to an electrical connector proximate to or within the roof 16 or an underlying headliner that is coupled to the signal processing circuitry. The signal processing circuitry may be associated with electronics onboard the motor vehicle 10 such as one or more controllers for processing signals received from the one or more antennas in the antenna module 40 or transmitted therefrom. It should be appreciated that other wired signal mount arrangements or wireless signal arrangements may be employed to transmit and receive antenna signals and communicate with the signal processing circuitry.

The antenna module 40 may include one or more antennas and other electrical circuitry. One example of an antenna module may include a CV2-X short range communication antenna that may allow for communication with a cellular network infrastructure. For example, the antenna module 40 may communicate with other motor vehicles in a vehicle-to-vehicle communication infrastructure or other infrastructures or networks, by using existing cellular network infrastructure. By arranging the antenna module 40 on the antenna mount system 30 proximate to the rearview mirror assembly 20 just rearward of the windshield 18, the antenna module 40 is substantially centered within the motor vehicle 10 for optimal signal communication, including signal transmissions and signal receptions.

The antenna mount system 30 advantageously allows for an antenna module 40 containing an antenna or multiple antennas to be mounted within an interior cabin 14 of the motor vehicle 10 in a manner that separates the antenna module 40 by a distance from metal and other electronics so as to prevent signal interference and provide enhanced signal communication. While the antenna mount system 30 is shown and described herein mounted to the mirror mount 22 of a rearview mirror assembly 20, it should be appreciated that the antenna mount system 30 may otherwise be provided on the mirror housing 26 itself or on another component within the cabin interior 14 of the motor vehicle 10 according to various other conceivable embodiments.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle interior antenna mount system comprising:
    a pedestal mount extending from a vehicle component in a cabin interior of a vehicle, the pedestal mount having a vertical slot extending from one end and one or more detents;
    an antenna module housing an antenna; and
    a locking arm connected to the antenna housing, the locking arm including a rib configured to engage the slot in the pedestal mount, wherein the locking arm includes an engagement portion that engages the at least one detent to lock the antenna housing on the pedestal mount.

2. The vehicle interior antenna mount system of claim 1, wherein the at least one detent comprises a first detent and a second detent.

3. The vehicle interior antenna mount system of claim 2, wherein each of the first and second detents includes an upper ramp surface and a rear locking wall.

4. The vehicle interior antenna mount system of claim 1, wherein the pedestal mount includes an angled support arm that extends from the vehicle component, wherein the angled support arm distances the pedestal mount from the vehicle component.

5. The vehicle interior antenna mount system of claim 4, wherein the angled support arm distances the antenna module from the pedestal mount.

6. The vehicle interior antenna mount system of claim 1, wherein the locking arm comprises a T-shaped arm.

7. The vehicle interior antenna mount system of claim 1, wherein the vertical slot extends from a top end of the pedestal mount.

8. The vehicle interior mount system of claim 1, wherein the locking arm is a snap fit locking arm.

9. The vehicle interior antenna mount system of claim 1, wherein the vehicle component comprises a mirror assembly.

10. The vehicle interior antenna mount system of claim 9, wherein the component comprises a mirror mount of a rearview mirror assembly.

11. A vehicle interior antenna mount system comprising:
a pedestal mount extending from a rearview mirror assembly in a cabin interior of a vehicle, the pedestal mount having a vertical slot extending from an end and one or more detents;
an antenna module for housing an antenna; and
a locking arm connected to the antenna module, the locking arm including a rib configured to engage the slot in the pedestal mount, wherein the locking arm includes an engagement portion that engages the at least one detent to lock the antenna module on the pedestal mount.

12. The vehicle interior antenna mount system of claim 11, wherein the at least one detent comprises a first detent and a second detent.

13. The vehicle interior antenna mount system of claim 12, wherein each of the first and second detents includes an upper ramp surface and a rear locking wall.

14. The vehicle interior antenna mount system of claim 11, wherein the pedestal mount includes an angled support arm that extends from the rearview mirror assembly, wherein the angled support arm distances the pedestal mount from the rearview mirror assembly.

15. The vehicle interior antenna mount system of claim 14, wherein the pedestal mount has a vertical plate connected to the angled support arm.

16. The vehicle interior antenna mount system of claim 11, wherein the locking arm comprises a T-shaped arm.

17. The vehicle interior antenna mount system of claim 11, wherein the vertical slot extends from a top end of the pedestal mount.

18. The vehicle interior antenna mount system of claim 11, wherein the locking arm is a snap fit locking arm.

19. The vehicle interior antenna mount system of claim 11, wherein the rearview mirror assembly is located proximate a roof and windshield in the vehicle.

20. The vehicle interior antenna mount system of claim 19, wherein the rearview mirror assembly comprises a mirror mount, and wherein the pedestal mount is connected to the mirror mount.

* * * * *